United States Patent [19]

Ogasawara

[11] Patent Number: 5,062,333

[45] Date of Patent: Nov. 5, 1991

[54] SHEARING MACHINE

[75] Inventor: Kazui Ogasawara, Kanagawa, Japan

[73] Assignee: Amada Company, Limited, Japan

[21] Appl. No.: 285,396

[22] Filed: Dec. 15, 1988

Related U.S. Application Data

[63] Continuation-in-part of Ser. No. 227,133, Aug. 2, 1988, abandoned.

[30] Foreign Application Priority Data

| Aug. 3, 1987 | [JP] | Japan | 62-118130 |
| Aug. 3, 1987 | [JP] | Japan | 62-192603 |
| Aug. 5, 1987 | [JP] | Japan | 62-119307 |

[51] Int. Cl.$^5$ .......................... B26D 1/08; B26D 7/32
[52] U.S. Cl. .......................................... 83/94; 83/155; 83/167
[58] Field of Search ............... 83/94, 155, 156, 157, 83/166, 167, 468.7, 377, 387, 390, 468, 386; 414/788.9, 789.1, 794.4, 793.4, 794, 789; 271/214, 217, 220, 221, 222

[56] References Cited

U.S. PATENT DOCUMENTS

| 1,722,819 | 7/1929 | Hunschauer | 83/386 |
| 2,224,279 | 12/1940 | Underwood | 83/94 |
| 3,260,145 | 7/1966 | Giordano | 83/386 |
| 3,861,258 | 1/1975 | Irvine | 83/157 |
| 3,874,260 | 4/1975 | Roch | 83/157 |
| 3,905,487 | 9/1975 | Hoke et al. | 414/789.1 |
| 4,679,473 | 7/1987 | Hirata et al. | 83/157 |
| 4,757,705 | 7/1988 | Arima et al. | 83/468 |
| 4,919,028 | 4/1990 | Tobita et al. | 83/157 |

FOREIGN PATENT DOCUMENTS

| 1346641 | 2/1974 | United Kingdom . |
| 1373949 | 11/1974 | United Kingdom . |
| 1398622 | 6/1975 | United Kingdom . |
| 1438593 | 6/1976 | United Kingdom . |
| 1532841 | 11/1978 | United Kingdom . |
| 1559240 | 1/1980 | United Kingdom . |
| 2074076 | 10/1981 | United Kingdom . |
| 2113136 | 8/1983 | United Kingdom . |

Primary Examiner—Hien H. Phan
Attorney, Agent, or Firm—Wigman & Cohen

[57] ABSTRACT

A shearing machine for shearing a plate workpiece includes a frame; a ram having an upper cutting blade and being mounted on the frame in a vertically movable manner; a worktable being fixedly mounted on the frame and having a lower cutting blade to define an opening between the upper cutting blade and the lower cutting blade so that the plate workpiece to be sheared may be fed from the front side of the upper blades into the opening with a portion of the plate workpiece extending to the rear side of the opening; a conveyor being mounted on the frame for supporting the portion of the plate workpiece and for conveying the sheared portion of the plate workpiece to the rear side of the shearing machine, the conveyor being vertically movable in response to the vertical movement of the ram; and a drive shaft means having an eccentric member for driving both the ram and the conveyor reciprocalby up and down so that the conveyor descends before, or simultaneously with, the actual cutting into the workpiece by the upper cutting blade. The machine includes a cost-saving adjustable restraint, and a shiftable sheared product stacking mechanism.

2 Claims, 5 Drawing Sheets

SHEARING MACHINE

This is a continuation-in-part of co-pending application Ser. No. 277,133 filed on Aug. 2, 1988, now abandoned.

BACKGROUND OF THE INVENTION

1. Field of the Invention

The present invention relates to a shearing machine, and more particularly to shearing machine wherein a sheared portion of a plate workpiece is supported at the rear of a shearing region in which the workpiece is sheared by means of a lower blade and an upper blade provided on a ram with free vertical movement, and wherein a conveyor means for conveying the separated plate sheared from the workpiece in the rear direction is provided so that it swings freely in the vertical direction and moves freely in the backward and forward direction.

2. Description of the Related Art

In commonly known shearing machines, a long lower blade extending in the lateral direction is mounted on the rear section of a work table, and an upper blade which shears a plate workpiece in cooperation with this lower blade is mounted on the lower part of a ram with free vertical movement, angled to the horizontal. In order to support the portion of the workpiece which protrudes from the work table in the rear direction When the workpiece is sheared by the action of the upper and lower blades in cooperation, and to convey this portion in the rear direction after shearing, a conveying means, such as, for example, a conveyor belt, is positioned at the rear of the shearing region from the upper and lower blades.

In a configuration as outlined above, when the ram descends to shear the workpiece, there is mutual interference between the ram and the conveying means so that it is necessary to lower the conveying means to eliminate this interference.

Accordingly, as a conventional configuration, a means, such as, for example, an air cylinder or the like, is provided to move the conveying means vertically. In this configuration, in order to eliminate the interference between the conveyor means and the ram it is necessary to first lower the conveying means and then lower the ram. Accordingly, when the ram first descends, the conveying means is already in the state where support has been removed from the workpiece. The portion of the workpiece which projects to the rear from the work table is therefore capable of bending from its own weight. Accordingly, in this configuration the effective support of the workpiece deteriorates and it is difficult to further improve the shearing precision. Also, in the configuration where the conveying means is moved vertically by means of an air cylinder or the like, because of the characteristics of the air cylinder or the like, the repeatability is limited from the velocity of the vertical movement of the conveyor means and improvement of productivity is hindered.

In addition, as an another conventional configuration, the ram and the conveying means are connected in a mutually pivotable manner through a link or the like. In this configuration the conveying means moves vertically integrated with the vertical motion of the ram, and, as a result, high speed shearing becomes possible and it is therefore possible to further improve the productivity. However, because this conveying means descends simultaneously with the start of the descent of the ram, the removal of the support of the workpiece also occurs simultaneously with the start of the descent of the ram, and the effective support of the workpiece deteriorates in the same manner as the previously discussed configuration.

Also, as is commonly known, in a shearing machine, when the workpiece is sheared by means of the upper and lower blades a plate restraint means is provided to secure the workpiece to the work table by pressure.

Conventionally, an air cylinder or a hydraulic cylinder is utilized as the plate restraint means. An advantage of a configuration of this type is the ease with which the pressure used in securing the workpiece can be adjusted. However, a diverter valve is required in the fluid pressure circuit and in the case of a high velocity shear in which the shearing is repeated at high velocity there is the problem that it becomes difficult to follow up the high velocity repetition.

Accordingly, in a high velocity shear a spring is used as the plate restraint means which secures the workpiece to the work table. In this mechanism, a pressure member which presses the workpiece is always energized in the downward direction by means of this spring, and when the ram begins to descend, the pressure member almost simultaneously secures the workpiece to the work table.

From this configuration there is good follow-up ability in the pressure member to follow-up the elevating action of the ram. However, there is a problem that the energizing force which presses the pressure member in the downward direction is not adjustable; and, in the case of a soft workpiece the workpiece will be compressed by the pressure member.

In addition, in a shearing machine in which the conveying means is positioned to the rear of the shearing region from the upper blade and the lower blade, a usual configuration is to position at the rear of the conveying means a storage means for storing the separated plate conveyed by the conveying means. In this type of configuration, a rear stopper is mounted on the rear side of the storage means to align the rear sides of the separated plates which are dropped from the conveying means, and a guide means is provided on the front side of the storage means to guide the separated plates dropped from the conveying means and align the front sides of the separated plates.

However, in the configuration in which the conveying means is provided at the rear of the shearing region so as to be movable to the backward, the guide means is provided at a position lower than the conveying means to eliminate interference between the conveying means and the guide means. Accordingly, the problem arises that a difference of the elevation between the storage means and the storage means where the separated plates is dropped from the conveying means to be stored, become large, and the the inclination of the separated plates while being dropped becomes great; this results in that the angled section or the side section of the separated plate hits the upper surface of the separated plates which are already accumulated, causing deformation or abrasion damage or the like being easily produced on the upper surface of the separated plate.

SUMMARY OF THE INVENTION

A first object of the present invention is to provide, with due consideration to the drawbacks of such conventional machines, a shearing machine wherein workpiece can be continuously supported, immediately prior to the start of the shearing or until the start of the shearing of the workpiece by an upper and a lower blade, by a conveying means provided at the rear of a shearing region in which the workpiece is sheared by the upper and the lower blade, and also provide high speed shearing.

A second object of the present invention is to provide a shearing machine provided with a plate restraining means which can, following the elevation action of a high speed shearing ram, positively secure a workpiece on a work table with pressure, and can easily adjust the force against the workpiece.

A third object of the present invention is to provide a shearing machine wherein the difference of elevation between the conveying means and the accumulating means can be made small, so that damage to the stored separated plates and the like can be eliminated.

These objectives are accomplished in the present invention by a configuration wherein a conveyor elevating means is provided which vertically activates a conveying means; the conveyor elevating means causes the conveying means to descend suddenly immediately prior, or at the time the shearing of the workpiece by an upper blade and a lower blade is commenced.

In addition, a plate restraint means is provided with an adjustment means for simultaneously adjusting the pressure of a plurality of elastic members which energize a plurality of pressure members in the downward direction.

Further, a guide member which guides a separated plate which falls from a conveying means into a storage means is provided at a position at almost the same height as the conveying means, and a swing plate is provided which reacts when the conveying means moves back and forth.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Figure 1:
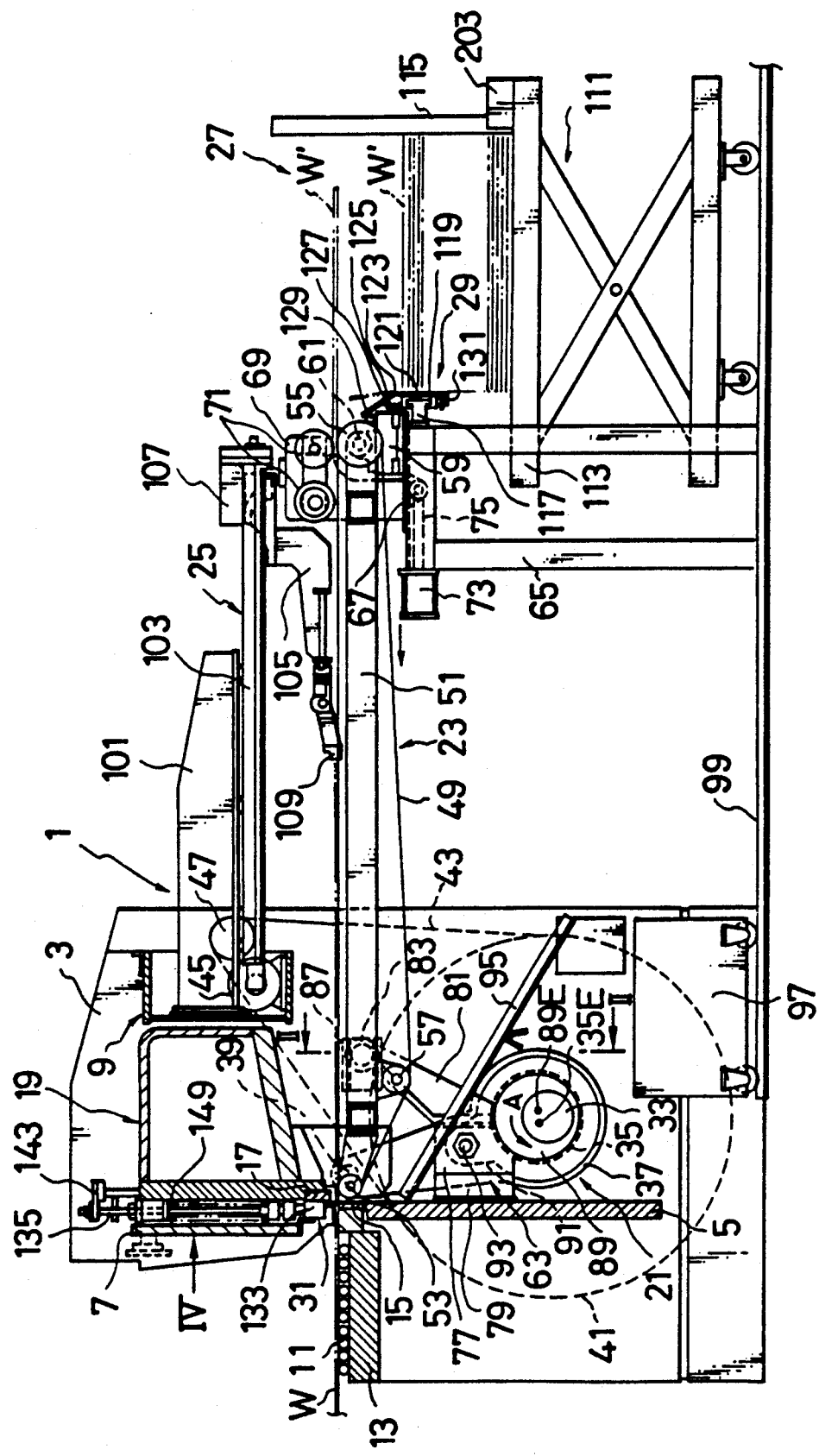
FIG. 1 is a side sectional drawing of a shearing machine.

Now referring to FIG. 1, a shearing machine 1 comprises a pair of vertical lateral sideplates 3 which is separated in the lateral direction which is perpendicular to the surface of the paper in FIG. 1. The pair of vertical lateral sideplates 3 form a frame structure integrally linked by means of a perpendicular lower connecting plate 5, upper connecting plate 7, and a horizontal connecting beam member 9. On the upper front side (upper left side in FIG. 1) of the lower connecting plate 5, a work table 13 with a plurality of supporting rollers 11 provided in a freely rotatable manner on its upper surface is provided horizontally, and a lower blade 15 is mounted on the rear of this work table 13 (the right side in FIG. 1), extending in the lateral direction.

In a rear position on the upper connecting plate 7, a ram 19 on which is provided an upper blade 17, which shears a workpiece W in cooperation with the lower blade 15, is mounted so as to be movable in the vertical direction. The upper blade 17 is provided on the ram 19, inclined with respect to the lower blade 15. In addition, the ram 19 is guided to move vertically by means of a conventional ram guide means (not shown in the drawings) provided on the lateral sideplate 3.

At a rear position on the lower connecting plate 5, in a lower position on the ram 19, a ram driving means 21 for moving the ram 19 vertically is mounted. In addition, at the rear of a shearing region in which the workpiece W is sheared by the lower blade 15 and the upper blade 17, a conveying means 23 is provided; the conveying means 23 supports a part of workpiece which projects from the worktable 13 in the rear direction, and conveys a separated plate W' sheared from the workpiece W. At an upper position of this conveying means 23, a back-gauge means 25 is provided for setting the shearing dimension of the workpiece W. Also, a storage means 27 is positioned at a rear position of the conveying means 23 for storage of the separated plate W' which is conveyed to the storage means 27 by the conveying means 23. Between the storage means 27 and the conveying means 23 a guidance means 29 is provided for guiding the separated plate W' which drops from the conveying means 23 into the storage means 27. In addition, a plate restraining means 31 is provided to secure the workpiece W to the work table 13 between the ram 19 had the upper connecting plate 7, when the shearing of the workpiece W is performed by the upper blade 17 and the lower blade 15.

By means of the above configuration, the following situation can be generally understood. Specifically, a part of the workpiece W which projects toward the rear from the worktable 13 is supported by means of the conveying means 23 and deformation from its own weigh is prevented. Also, the back-gauge means 25 contacts the rear edge of the workpiece W and sets the shearing length. Then, the ram 19 descends, driven by the ram drive means 21, and when the workpiece W is sheared by the upper blade 17 and the lower blade 15, the workpiece W is secured to the work table 13 by the plate restraining means 31. The separated plate W' sheared from the workpiece W is moved in the rear direction by the conveying means 23, and is dropped into the storage means 27 for storage.

The ram drive member 21 is provided with a drive shaft 33 both ends of which are supported in a freely rotating manner by the lateral side plates 3. The tip of a connecting rod 37, the base section of which engages a first eccentric member 35 provided on the driveshaft 33, is pivotally supported on the lower section of the ram 19 through a connecting pin 39. A flywheel 41 is mounted on one end of the drive shaft 33 to rotate the drive shaft 33 and a belt 43, which passes around the flywheel 41, also passes around a pulley 47 which is rotated by a motor 45.

By means of this configuration, the driveshaft 33 is rotated, driven by the motor 45, and it can be understood that the ram 19 is moved vertically via the first eccentric member 35 and the connecting rod 37.

The conveying means 23 comprises a plurality of endless conveyor belts 49 in parallel. On the front and back of a belt conveyor frame 51 a pair of rollers 53, 55 are provided around which the conveyor belts 49 run. The rear roller 55 is linked to a conveyor motor (omitted from the drawings) provided in a suitable location. In addition, a tension roller 57 is provided in a freely rotating manner on the lower section of the frame 51. Further, in the case where it is necessary to convey the workpiece W by magnetic means, it is also possible to position electromagnets in a plurality of positions on the frame 51.

The rear of the frame 51 is pivotally supported, through a shaft 61, by a bearing 59 which can move freely in the backward and forward direction; the front of the frame 51 is supported on a conveyor elevating means 63 which moves the conveying means 23 vertically corresponding to the vertical movement of the ram 19; also, as is explained in detail later, the frame 51 is supported on the conveyer elevating means 63 so as to be movable in the backward and forward direction (See FIG. 2).

More specifically, as can be clearly understood from FIG. 1, on the upper surface of a sub-frame 65 positioned at the rear position of the shearing region, a slide plate 67 is provided which can freely move in the backward and forward direction. The bearing 59 is mounted on the side plate 67. In addition, a pair of pinch roller brackets 69 are provided, one on the left and one on the right side of the slide plate 67. Between the pinch roller brackets 69 a plurality of pinch rollers 71 provided in a freely rotating manner, are separated from each other in the backward and forward direction. In order to move the slide plate 67 back and forth, a hydraulic cylinder 73 is mounted on the sub-frame 65, and a piston rod 75 provided on the hydraulic cylinder 73 is connected to the slide plate 67.

By means of this configuration, it can be understood that, from the activation of the hydraulic cylinder 73, the conveyor means 23 can move in the backward and forward direction.

Figure 2:
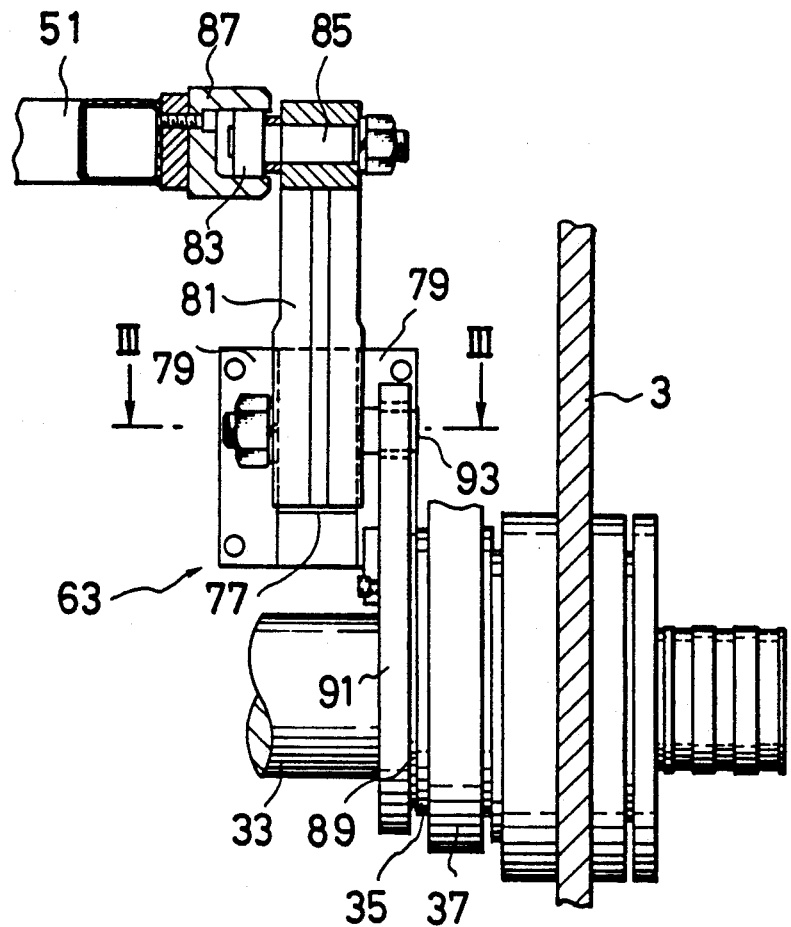
FIG. 2 is an enlarged sectional drawing viewing along the line II—II of FIG. 1.
Figure 3:
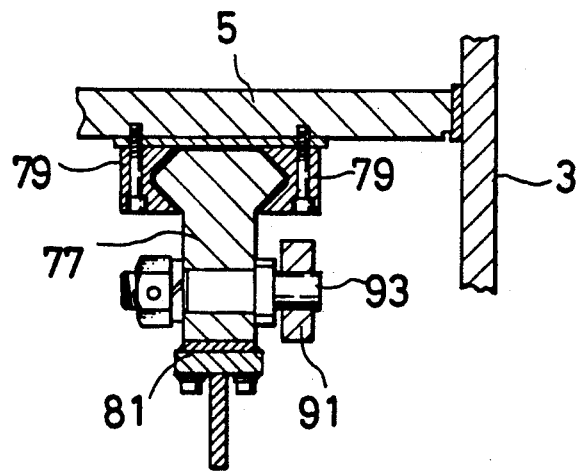
FIG. 3 is a sectional drawing viewing along the line III—III of FIG. 2.

Now referring to FIGS. 1 to 3, a pair of elevating sliders 77, which move freely in the vertical direction, is provided on both the left and right sides of the conveyor elevating means 63 to move the conveying means 23 vertically. Both the left and right elevating sliders 77 are bearingly guided in a freely movable manner in the vertical direction by a guide member 79 mounted on the rear surface of the lower connecting plate 5 (the lower surface in FIG. 3). A supporting roller 83 is mounted in a freely rotating manner on the upper section of a lateral support bracket 81 mounted integrally on each of the elevating sliders 77, through a shaft 85. The supporting roller 83 engages a channel-shaped guide member 87 which extends in the backward and forward direction on both the left and right sides of the frame 51, and the front side of the frame 51 is supported to move freely in the backward and forward direction.

In order to vertically move the elevating slider 77, a second eccentric member 89 is provided on the drive shaft 33, the second eccentric member 89 being engaged with a engaging hole formed in the bottom portion of a connecting rod 91 and the tip of a connecting rod 91 being pivotally connected to the elevating slider 77 through a connecting pin 93.

A shaft center 89E of the second eccentric member 89, viewed in the direction of rotation of the drive shaft 33 (the direction indicated by the arrow A in FIG. 1), is provided with its phase staggered in a slightly delayed manner from a shaft center 35E of the first eccentric member 35 for moving the ram 19. As a result of the phase difference of the shaft center 35E of the first eccentric member 35 and the shaft center 89E of the second eccentric member 89, immediately prior to or simultaneously with the start of the shearing of the workpiece by the upper and the lower blade 15, 17 provided on the ram 19, which starts to descend from the top dead center from the rotation of the drive shaft 33 in the direction of the arrow A, the shaft center 85E suddenly descends. In other words, immediately prior to, or simultaneously with, the start of the shearing of the workpiece W by the upper blade 17 and the lower blade 15, the conveying means 23 is suddenly lowered through a connecting rod 91 and the elevating slider 77, and because of this configuration the support of the workpiece W is removed.

By means of this configuration, the workpiece W is supported by the conveying means 23 immediately prior to or simultaneously with the start of the shearing of the workpiece W. This provides good, effective support of the workpiece W and it can be understood that the interference of the ram 19 and the conveying means 23 is prevented. In addition, the vertical motion of the ram 19 and the vertical motion of the conveying means 23 is carried out by the use of the first and second eccentric members 35, 89 provided on the common drive shaft 33, so that the vertical motion of the ram 19 and the vertical motion of the conveying means 23 always have a synchronous relationship and high speed shearing is possible.

In this embodiment of the present invention, it has been explained that the first and second eccentric members 35, 89 are provided on a common drive shaft. However, it is also possible to have a configuration in which separate shafts are provided so that the shafts of the first and second eccentric members 35 and 89 rotate synchronously.

In addition, in the previously discussed configuration, the conveying means 23 can be moved in the rear direction by the activation of the hydraulic cylinder 73, and a comparatively large space can be opened between the lower blade 15 and the conveying means 23. Specifically, scrap can be dropped at the rear of the lower blade 15. Accordingly, an inclining scrap chute 95 is provided on the rear surface of the lower connecting plate 5. In the lower position of the scrap chute 95, a scrap box 97 is provided which can move freely in the backward and forward direction, running along a guide rail 99.

Again referring to FIG. 1, the backgauge means 25 comprises a carriage 105 provided on a backward and forward guide member 103 in a freely movable manner in the backward and forward direction supported on a support sub-bracket 101 projecting in the rear direction from the connecting beam 9. The carriage 105 is moved back and forth by a ball screw extending in backward and forward direction (omitted from the drawings), the ball screw being rotated from a motor 107; a stopper gauge 109 provided on the carriage 105 has such a configuration that it has free vertical movement with respect to the pathline of the workpiece W, for example, by being activated by an air cylinder (omitted from the drawings). The structure of the backgauge means 25 may be any conventional structure, so that a more detailed explanation is omitted here.

The storage means 27 in this embodiment of the present invention comprises a conventional lifter table 111 having a table 113. On the rear side of the top surface of the table 113, a vertically positioned rear stopper 115 is provided to align the rear of the stored separated plate W'. The vertical movement of the lifter table 111 of this type is performed by the use of a hydraulic cylinder (omitted from the drawings). The height of the separated plate W' stored on the table 113 is detected and the height of the table is adjusted so that the difference of height between the conveying means and the stored separated plate W' is substantially uniform. Because this type of lifter table is commonly known, a more detailed explanation of the configuration is omitted.

The guidance means 29 for guiding the separated plate W' which is dropped from the conveyor means 23 to be stored in the storage means 27, as indicated in FIG. 1, is provided opposite the rear stopper 115. To describe in greater detail, a support member 117 is provided in the shape of a long guide rail in the lateral direction on the upper rear surface of the sub-frame 65. A plurality of guidance means 29 are installed in a plurality of locations in a freely position-adjustable manner in the lateral direction on the support means 117.

Specifically, a support block 119 on the guidance means 29 is supported so that its position is freely adjustable in the lateral direction on the support member 117. On the rear surface of the support block 119 a front stopper plate 121 is provided to align the front section of the separated plate W'. A swing plate 125 is provided in a freely swinging manner from front to rear on the upper section of the support block 119 via a hinge pin 123. As is clearly shown in FIG. 1, the swing plate 125 is positioned at almost the same height as the conveying means 23, and a spring 127 which energizes the swing plate 125 in the direction of the conveying means 23 is provided between the swing plate 125 and the support block 119. A roller 129 is provided in a position in which the swing plate 125 faces the conveying means 23.

In addition, on the lower section of the support block 119, a suitable sensor 131 such as a limit switch or a proximity switch is provided to detect the approach of the table 113 during its elevation. The sensor 131 prevents the table 113 from contacting the guide means 29 when the table 113 is being elevated. When the approach of the table 113 is detected a signal is output to a control device which halts the ascent of the table 113.

With this configuration, as previously described, when the conveying means 23 moves toward the rear, the swing plate 125 on the guide means 29 can swing in the rear direction opposed by the spring 127. Accordingly, the swing plate 125 is set at a height which is almost identical to that of the conveying means 23, and the fall of the separated plate W' from the conveying means 23 to the guide means 27 can be made smaller than in conventional devices; as explained earlier, in the conventional devices, a plate equivalent to the swing plate 125 of this embodiment is immovably mounted on the upper section of the support block 119, positioned at the height sufficiently lower than that of the conveying means 23 to avoid interference with the conveying means 23. Therefore, in this embodiment, damage to the separated plate W', which is a problem when the difference in height is large, can be prevented. In addition, in this embodiment, the table 113 on the storage means 27 can be prevented from contacting the guide means 29.

Figure 4:
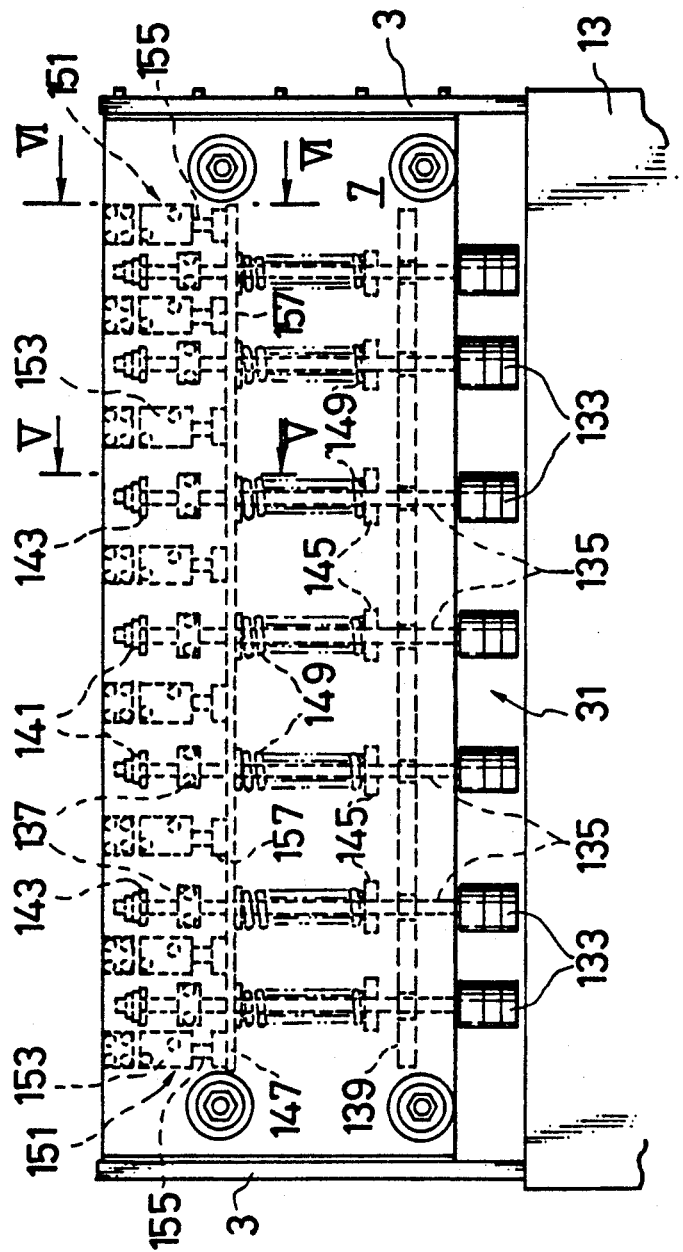
FIG. 4 is a view in the direction of the arrow IV in FIG. 1.
Figure 5:
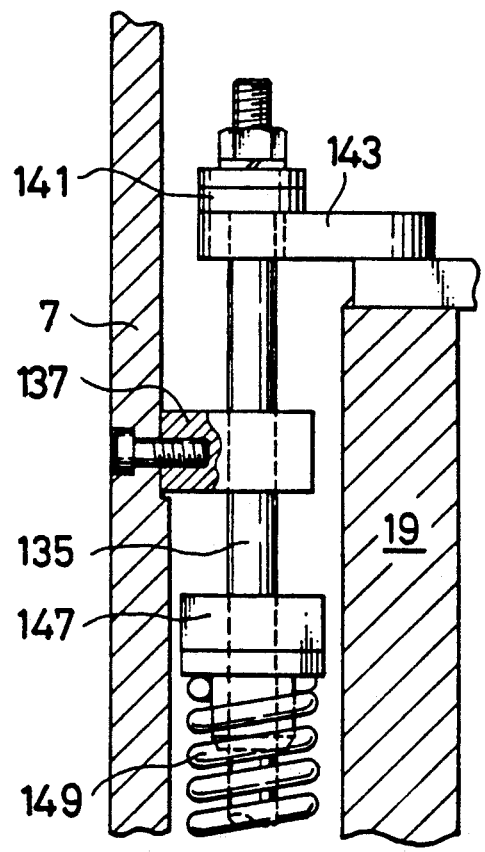
FIG. 5 and FIG. 6 are enlarged sectional drawings viewed along the lines V—V and VI—VI in FIG. 4 respectively.
Figure 6:
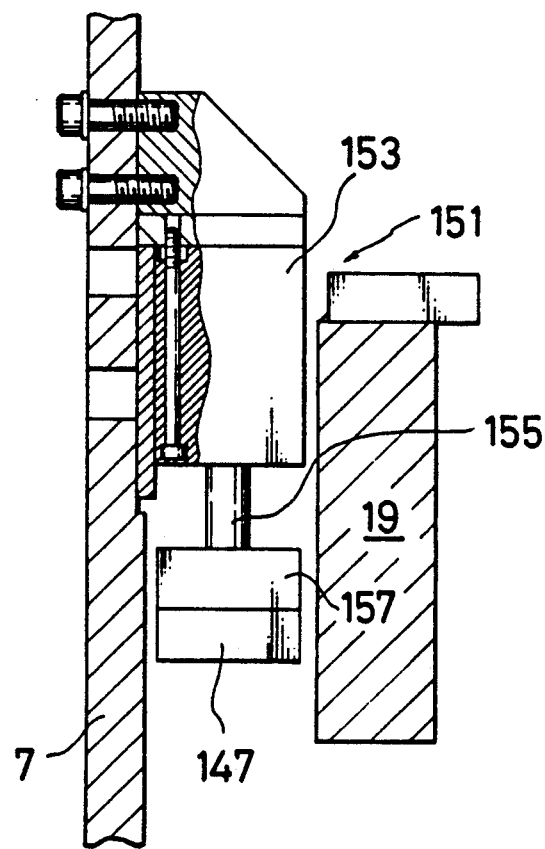

Now referring to FIG. 4 to FIG. 6, the plate restraining means 31 comprises a plurality of elevating rods 135 provided, at its lower edge, with a pressure member 133 which secures the workpiece W to the work table 13. The elevating rods 135 are positioned at suitable intervals in the lateral direction. An upper guide block 137 and a lower guide block 139 mounted on the rear surface of the upper connecting plate 7 provide guiding support with free vertical movement close to the upper sections and the lower sections respectively of the elevating rods 135. On each of the respective upper ends of the elevating rods 135 a flange member 141 is mounted. A fork member 143 mounted on the upper section of the ram 19 projects from the lower end of each flange member 141. Under normal conditions the elevating rods 135 hang down and are supported from the fork members 143 through the flange members 141.

Between a spring seat 145 mounted on each elevating rod 135 in a higher position than the lower guide member 139, and a seat plate 147 which is pierced with free vertical movement by each elevating rod 135 in a lower position than the upper guide block 137, an elastic body 149, such as a plurality of coil springs, is flexibly mounted. Accordingly, each elevating rod 135 is always energized in the lower direction.

The seat plate 147, as can be clearly seen in FIG. 4, extends in the lateral direction. On an upper position on the seat plate 147, a pressure adjustment means 151, which freely adjusts the pressure energization in the lower direction of each elevating rod 135 by means of the elastic body 149, is provided. As a pressure adjustment means 151, in this embodiment of the present invention, a plurality of hydraulic cylinders 153 are provided. The hydraulic cylinders 153 are mounted on the rear surface of the upper connecting plate 7. The lower section of a piston rod 155 provided with free vertical movement on the hydraulic cylinder 153, contacts the upper surface of the seat plate 147 through a pad 157.

By this configuration, when the ram 19 descends from the action of the ram drive means 21, a fork member 143 integrally descends so that each elevating rod 135 descends from the action of the elastic body 149, and the workpiece W is secured to the work table 13 by means of the pressure member 133. After this, as previously outlined, the workpiece W is sheared by the upper blade 17 and lower blade 15.

When the ram 19 is elevated from its low point by the action of the ram drive means 21, the fork members 143 contact the flange members 141 and the elevating rods 135 are raised to oppose the elastic body 149 so that the workpiece W is released from the pressure member 133.

As previously described, before the workpiece W is secured to the work table 13 by the pressure member 133, the piston rod 155 of the hydraulic cylinder 153 may be extendingly activated. Then, the elastic body 149 can cause the workpiece W to be held even more securely by applying a large downward compression from the pressure means 133 through the seat plate 147. Specifically, the pressure of the pressure member 133 can be adjusted by activation of the hydraulic cylinders 153, and even when a flexible material is handled there is no compression deformation produced and the workpiece can be secured.

In order to adjust the pressure in multistages, it is desirable that the hydraulic cylinder 153 is the type which can be activated in stages. For a configuration in which the pressure can be adjusted in stages, it is also possible to adjust the amount of activating fluid which is fed into the hydraulic cylinder 153.

Figure 7:
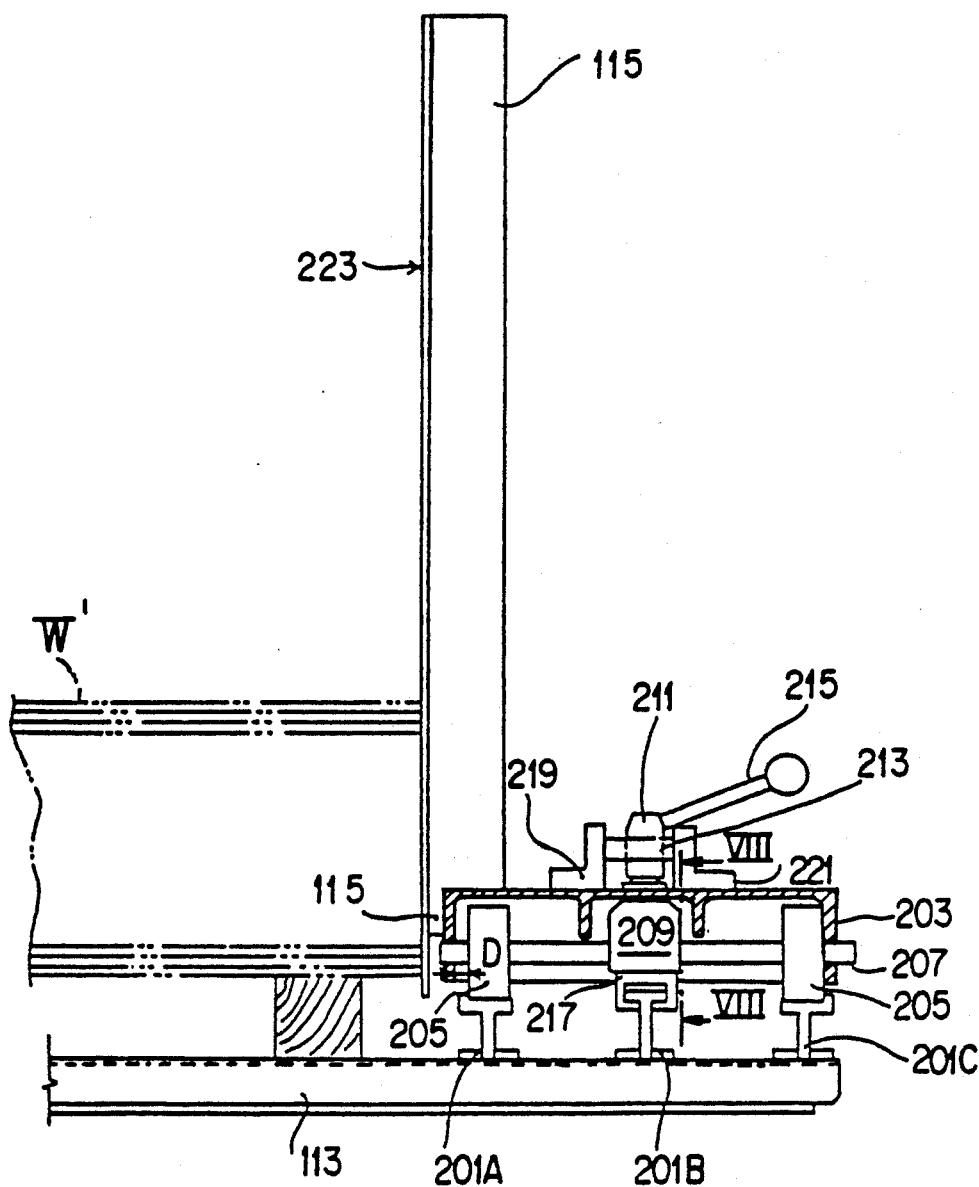
FIG. 7 is a side view in partial cross-section of an additional embodiment of the storage means of the shearing machine illustrated in FIG. 1 which includes a movable workpiece stopper means.
Figure 8:
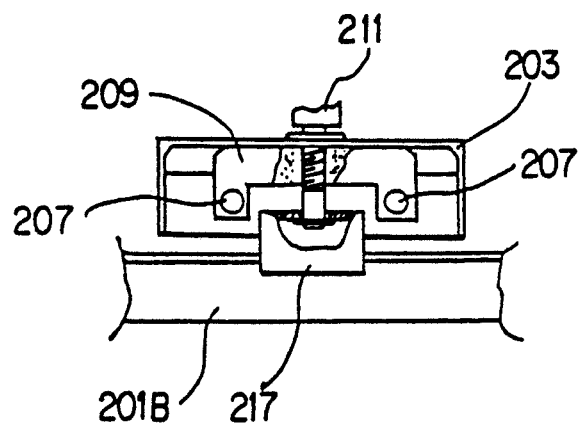
FIG. 8 is a sectional view taken along liens VIII—VIII in FIG. 7.

Now referring to FIGS. 7 and 8, the table 113 is provided with rail means 201A, 201B and 201C at the top surface of the rear end. A box like means 203 is mounted on the rail means 201A and 201C through wheels 205, 205 and a pair of shafts 207, 207 to be transferred fore and aft as illustrated in FIG. 7. The shafts 207, 207 slidably support the box like means 203 so that the box like means 203 can be shifted for a distance D in FIG. 7.

The box like means 203 is provided with a pair of L-shaped members 219, 221 and a long hole (not shown) at a central portion thereof.

A nut member 209 is provided with shaft holes to hold the pair of shafts 207, 207 respectively. A bolt 211 inserted though the long hole is threaded into the nut member 209 and is rotatably connected to a C-shaped member 217 which holds the to of the rail means 201B. The bolt 211 is integrally provided with a handle 215 and a cam member 213 which is engageable with the L-shaped members 219, 221. The box like means 203 is further provided with the rear stopper 115 and a stopper plate 223.

In this configuration, when the handle 215 is rotated, the cam member 213 pushes either one of the L-shaped members 219, 221 so that the box like means 203 is shifted rightward or leftward. Then the stopper plate 223 is shifted to contact with or to be moved apart for the piled workpieces W'. FIG. 7 shows a status when the box like means 203 is shifted leftward for receiving the fed workpieces W'.

Furthermore, the C-shaped member 218 is lifted by the bolt 211 threaded with the nut member 209 so that the C-shaped member 217 can hold the rail mans 201B in a locking manner.

In this configuration, when the handle 215 is so rotated that the cam member 213 pushes the box like means rightward, the C-shaped member 217 is lowered for releasing the rail means 201B. Therefore, the stopper plate 223 can move away from the pile of the workpieces and is kept freely movable fore and aft of FIG. 7 along the rail means 201A and 201C By the configuration described above, the sheared workpieces supplied one by one from the conveying means are received by the stopper plate at a selected place on the table 113 to be stacked in a pile. Then, the stopper plate can be removed for the distance D from the stacked pile so that the pile of the sheared workpieces can be bundled or lifted directly for transportation.

As can be understood from the above explanation, by means of the present invention it is possible to support the workpiece by the conveying means until the start of the shearing of the workpiece so that it is possible to improve the effective support of the workpiece. The conveying means is connected to the vertical movement of the ram so that high speed vertical movement is possible. In addition, the plate restraining means, by the use of an elastic body, is always energized in the lower direction, and tied in to the vertical movement of the ram so that the pressure securing and pressure release of the workpiece can be carried out and the vertical movement of the ram can be performed at high speed. In addition, the adjustment of the pressure in a plurality of elastic bodies in the plate restraint means is carried out simultaneously so that this adjustment is extremely easy, and even when the workpiece is made of a soft material the development of pressure deformation can be prevented.

In addition, the height which the separated plated must fall from the conveying means into the storage means can be made small so that the separated plate can be stored without any damage being produced.

Although the invention has been described in its preferred embodiments, it is to be understood that various changes and modifications may be made within the purview of the appended claims without departing from the true scope and spirit of the invention in its broader aspects.

What is claimed is:

1. A shearing machine for shearing a plate workpiece comprising:
    a frame;
    a ram having an upper cutting blade and being mounted on the frame in a vertically movable manner;
    a worktable having a lower blade and being fixedly mounted on the frame;
    a conveying means for conveying a sheared plate workpiece;
    a storage means positioned at the delivery end of the conveying means for receiving the sheared plate workpiece in a stacked manner;
    a stopper means being movably guided on a guide means provided along a rear side of the storage means, in an X-direction parallel to the cutting blades for aligning a pile of the sheared plate workpieces stacked at a selected place on the storage means and further movable in a Y-direction crossing normal to the X-direction, said stopper means provided with a lock means comprising a rotatable member having a cam surface, said cam surface having a minimum and maximum radial dimension which positively shifts the stopper means tin the Y-direction by a displacement distance no greater than the difference between said maximum and minimum radial dimensions to approach the conveying means when securing the stopper means on the guide means, said lock means being adapted to positively move the stopper means to a position spaced apart form the stacked pile of the sheared plate workpiece by said displacement distance when releasing the secured stopper means so that the stopper means is unlocked to move freely along the guide means.

2. A shearing machine for shearing a plate workpiece comprising:
    a frame;
    a ram having an upper cutting blade and being mounted on the frame in a vertically movable manner;
    a worktable having a lower blade and being fixedly mounted on the frame;
    a conveying means for conveying a sheared plate workpiece;
    a storage means positioned at the delivery end of the conveying means for receiving the sheared plate workpiece in a stacked manner;
    a stopper means being movably guided on a guide means provided along a rear side of the storage means, in an X-direction parallel to the cutting blades for aligning a pile of the sheared plate workpieces stacked at a selected place on the storage means and further movable in a Y-direction crossing normal to the X-direction, said stopper means provided with a lock means comprising a screw member and a cam member mounted on the screw member to be rotated therewith, which positively shifts the stopper means in the Y-direction to approach the conveying means when securing the stopper means on the guide means, said lock means being adapted to positively move the stopper means to a position spaced apart from the stacked pile of the sheared plate workpiece when releasing the secured stopper means so that the stopper means is unlocked to move freely along the guide means.

* * * * *